(12) United States Patent
Kabe et al.

(10) Patent No.: US 11,467,174 B2
(45) Date of Patent: Oct. 11, 2022

(54) AUTOMATIC ANALYSIS APPARATUS

(71) Applicant: Hitachi High-Technologies Corporation, Tokyo (JP)

(72) Inventors: Yoshihiro Kabe, Tokyo (JP); Yukinori Sakashita, Tokyo (JP); Katsuhiro Kambara, Tokyo (JP); Taku Sakazume, Tokyo (JP); Tatsuya Fukugaki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 425 days.

(21) Appl. No.: 16/083,584

(22) PCT Filed: Jan. 19, 2017

(86) PCT No.: PCT/JP2017/001627
§ 371 (c)(1),
(2) Date: Sep. 10, 2018

(87) PCT Pub. No.: WO2017/168973
PCT Pub. Date: Oct. 5, 2017

(65) Prior Publication Data
US 2019/0145997 A1    May 16, 2019

(30) Foreign Application Priority Data
Mar. 28, 2016   (JP) .............................. JP2016-062976

(51) Int. Cl.
*G01N 35/10* (2006.01)
*G01N 35/08* (2006.01)
*G01N 35/00* (2006.01)

(52) U.S. Cl.
CPC ... *G01N 35/1004* (2013.01); *G01N 35/00712* (2013.01); *G01N 35/08* (2013.01); *G01N 35/10* (2013.01)

(58) Field of Classification Search
CPC ......... G01N 35/1004; G01N 35/00712; G01N 35/08; G01N 35/10
See application file for complete search history.

(56) References Cited

U.S. PATENT DOCUMENTS 4,683,120 A * 7/1987 Meserol ............... G01N 33/491
356/246
2007/0195122 A1   8/2007 Hiruma et al.
(Continued)

FOREIGN PATENT DOCUMENTS

CN    201438188 U    4/2010
CN    103033635 A    4/2013
(Continued)

OTHER PUBLICATIONS

International Search Report (PCT/ISA/210) issued in PCT Application No. PCT/JP2017/001627 dated Apr. 4, 2017 with English translation (four pages).
(Continued)

*Primary Examiner* — Benjamin R Whatley
(74) *Attorney, Agent, or Firm* — Crowell & Moring LLP (57) ABSTRACT

The purpose of the present invention is to constantly keep a state in a flow cell steady by filling a detection flow channel with a liquid. The configuration of the present invention for solving the aforementioned problem is as follows. Specifically, the present invention is an automatic analysis apparatus provided with a detection unit including a flow cell that accommodates a liquid serving as an analysis subject; a suction nozzle that is positioned upstream of the flow cell and that sucks the liquid to be introduced into the flow cell; a pump that is positioned downstream of the flow cell and that supplies the liquid to the flow cell; flow channels that connect the flow cell, the suction nozzle, and the pump; a power source; and a power-cutting instructing unit that gives an instruction to cut the power supply at least to the pump.

(Continued)

The automatic analysis apparatus is characterized by being provided with a control unit that performs first liquid supply processing when the power-cutting instruction from the power-cutting instructing unit is not received, and that performs second liquid supplying processing when the power-cutting instruction from the power-cutting instructing unit is received, thus supplying the liquid to the flow cell.

8 Claims, 7 Drawing Sheets

(56) References Cited

U.S. PATENT DOCUMENTS

| | | | | |
|---|---|---|---|---|
| 2010/0108101 | A1* | 5/2010 | Shibata | B01L 3/0293 134/22.11 |
| 2011/0223064 | A1* | 9/2011 | Katsumi | G01N 35/1002 422/73 |
| 2013/0084213 | A1 | 4/2013 | Nishikawa et al. | |
| 2014/0024133 | A1* | 1/2014 | Carter, Jr. | B01F 15/00253 436/174 |
| 2015/0037214 | A1* | 2/2015 | Sakashita | G01N 35/08 422/67 |
| 2015/0056098 | A1* | 2/2015 | Inaba | G01N 27/745 422/69 |
| 2015/0368606 | A1* | 12/2015 | Bishop | G01N 35/04 435/34 |
| 2016/0154016 | A1* | 6/2016 | Yamashita | G01N 35/00871 436/50 |

FOREIGN PATENT DOCUMENTS

| | | | |
|---|---|---|---|
| CN | 104105971 A | | 10/2014 |
| EP | 2 182 370 A2 | | 5/2010 |
| EP | 2 365 342 A2 | | 9/2011 |
| EP | 2 672 272 A1 | | 12/2013 |
| JP | 2007-245136 A | | 9/2007 |
| JP | 2009-224653 A | | 10/2009 |
| JP | 2010-256050 A | | 11/2010 |
| JP | 2011247617 A | * | 11/2011 |
| JP | 2013-76624 A | | 4/2013 |
| JP | 5489283 B2 | | 5/2014 |
| JP | 2015-215274 A | | 12/2015 |
| WO | WO-2015019880 A1 | * | 2/2015 ......... G01N 35/0092 |

OTHER PUBLICATIONS

Japanese-language Written Opinion (PCT/ISA/237) issued in PCT Application No. PCT/JP2017/001627 dated Apr. 4, 2017 (five pages).

Chinese-language Office Action issued in Chinese Application No. 201780018972.5 dated Apr. 1, 2021 with English translation (16 pages).

* cited by examiner

AUTOMATIC ANALYSIS APPARATUS

TECHNICAL FIELD

The present invention relates to an automatic analysis apparatus including a flow cell.

BACKGROUND ART

Patent Literature 1 discloses the automatic analysis apparatus configured to carry out qualitative/quantitative analysis of a specific component contained in a biological sample such as blood and urine. The disclosed analysis apparatus as described above is provided with a flow channel mechanism including a detector of flow cell type. The flow channel structure including the flow cell detector is provided with a nozzle for suction or discharge of a liquid which contains a measuring object such as a reaction liquid and a reagent as well as air, a flow cell detector configured to detect the measuring object, a syringe that generates a pressure difference for suction or discharge of the liquid and air, a drain that discharges the detected liquid and air, and a flow channel for communication among the nozzle, the flow cell detector, the syringe, and the drain.

The flow channel may further be provided with an atmosphere releasing part. In the state that the flow channel is filled with water, the atmosphere releasing part serves to keep the water level balance inside the flow channel so as to retain the liquid inside the flow channel ranging from the nozzle to the atmosphere releasing part.

CITATION LIST

Patent Literature

Patent Literature 1: Japanese Unexamined Patent Application Publication No. 2010-256050

SUMMARY OF INVENTION

Technical Problem

The atmosphere releasing part formed in the flow channel may cause the failure in filling the flow channel with water because of the liquid loss in the flow channel resulting from evaporation from the atmosphere releasing part. When the above-described state is kept for a long period of time, it may be difficult to keep the flow cell state steady.

It is an object of the present invention to make an inner state of the flow cell steady by filling the detection flow channel with a liquid.

Solution to Problem

The structure of the present invention for solving the above-described problem will be described as below.

The automatic analysis apparatus includes a detection unit having a flow cell that accommodates a liquid serving as an analysis subject, a suction nozzle that is positioned upstream of the flow cell and that sucks the liquid to be introduced into the flow cell, a pump that is positioned downstream of the flow cell and that supplies the liquid to the flow cell, flow channels that connect the flow cell, the suction nozzle, and the pump, a power source, a power-cutting instructing unit that gives an instruction to cut the power supply at least to the pump, and a control unit that executes first liquid supplying processing when the power-cutting instruction from the power-cutting instructing unit is not received, and that executes second liquid supplying processing when the power-cutting instruction from the power-cutting instructing unit is received for supplying the liquid to the flow cell.

Advantageous Effect of Invention

The present invention is capable of constantly keeping an inner state of the immunoanalysis flow cell steady.

DESCRIPTION OF EMBODIMENT

An embodiment according to the present invention will be described hereinafter.

Figure 1:
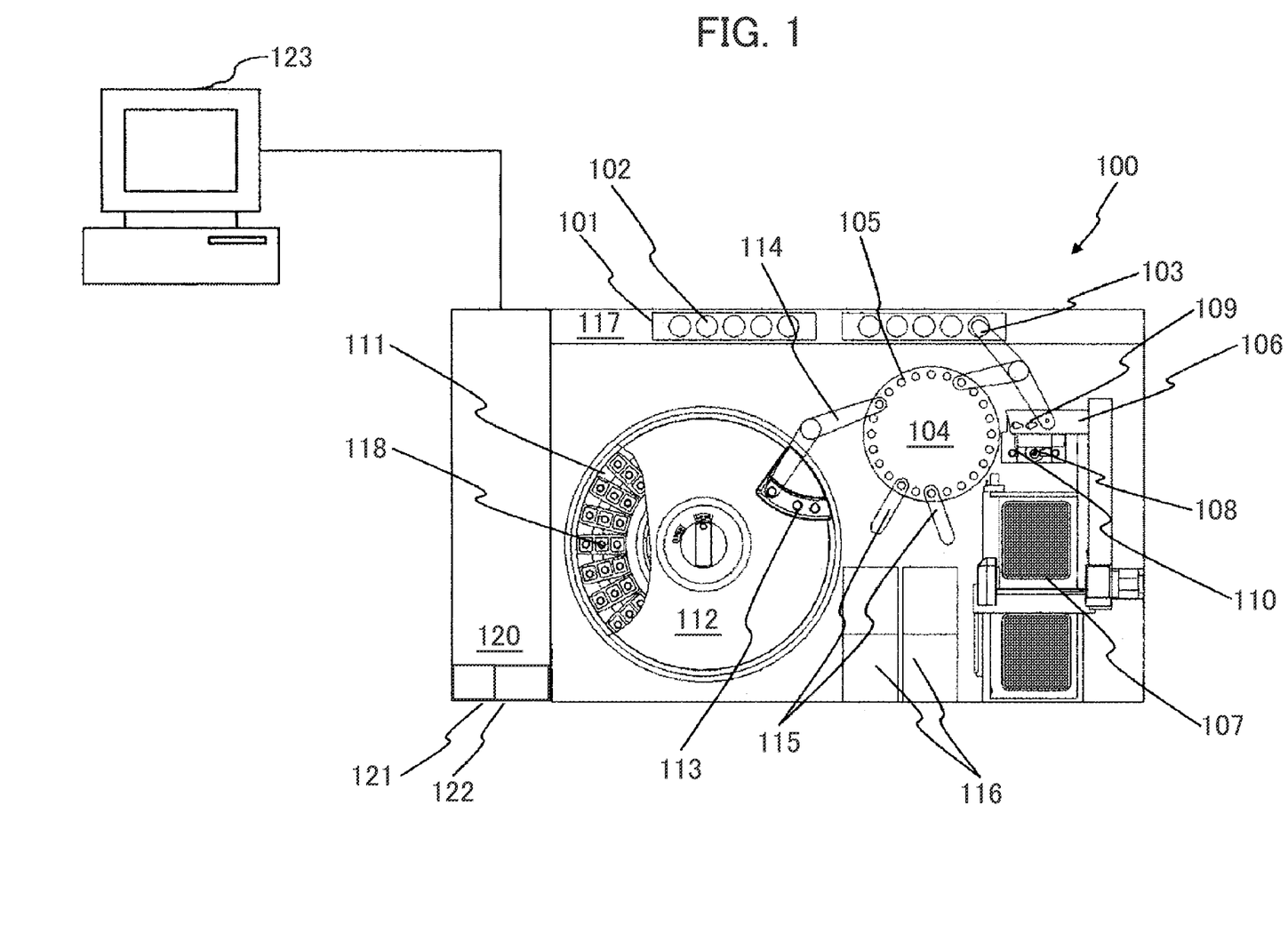
FIG. 1 is a view showing an overall structure of an analysis apparatus.

An overall structure of an automatic analysis apparatus according to the present embodiment will be described referring to FIG. 1.

An analysis apparatus 100 is connected to a rack carriage section 120 for storing a rack 101. The rack carriage section 120 is provided with a power supply instructing unit 121 and a power-cutting instructing unit 122 for the automatic analysis apparatus. Both the power supply instructing unit 121 and the power-cutting instructing unit 122 are buttons through which an operator is allowed to perform input operations. It is possible to provide an input section for power supply instruction or power-cutting instruction on the display section of a control computer 123 for controlling operations of the respective mechanisms of the automatic analysis apparatus. A sample container 102 for holding a sample is mounted on the rack 101, which is moved to a sample dispensing position around a sample dispensing nozzle 103 on a rack carriage line 117. A plurality of reaction vessels 105 may be mounted on an incubator disk 104 which may be rotated for moving each of the circumferentially arranged reaction vessels 105 to the predetermined position, respectively.

A sample dispensing chip/reaction vessel carrying mechanism 106 is movable in three directions of X-axis, Y-axis, and Z-axis in the range that covers a sample dispensing chip/reaction vessel holding member 107, a reaction vessel stirring mechanism 108, a sample dispensing chip/reaction vessel disposal hole 109, a sample dispensing chip loading position 110, and a specific part of the incubator disk 104 for carrying the sample dispensing chip and the reaction vessel.

A plurality of unused reaction vessels and unused sample dispensing chips are disposed on the sample dispensing chip/reaction vessel holding member 107. The sample dispensing chip/reaction vessel carrying mechanism 106 moves to the position above the sample dispensing chip/reaction vessel holding member 107, and is lowered to grip the unused reaction vessel. It is then lifted to move to the predetermined position above the incubator disk 104, and lowered to place the reaction vessel.

The sample dispensing chip/reaction vessel carrying mechanism 106 moves to the position above the sample dispensing chip/reaction vessel holding member 107, and is lowered to grip the unused sample dispensing chip. It is then lifted to move to the position above the sample dispensing chip loading position 110, and lowered to place the sample dispensing chip.

The sample dispensing nozzle 103 is rotatable and vertically movable. After rotational movement to the position above the sample dispensing chip loading position 110, the sample dispensing nozzle 103 is lowered to have its tip press fitted with the sample dispensing chip. The sample dispensing nozzle 103 with which the sample dispensing chip has been fitted is moved to the position above the sample container 102 disposed on the carriage rack 101. It is then lowered to suck a predetermined quantity of the sample held in the sample container 102. The sample dispensing nozzle 103 which has sucked the sample is moved to the position above the incubator disk 104, and then lowered to discharge the sample to the unused reaction vessel 105 held by the incubator disk 104. Upon termination of the sample discharge, the sample dispensing nozzle 103 moves to the position above the sample dispensing chip/reaction vessel disposal hole 109 so that the used sample dispensing chip is disposed from the disposal hole.

The reagent disk 111 includes a plurality of reagent containers 118. A reagent disk cover 112 is provided over the disk 111 so as to keep its inside at a predetermined temperature. A reagent disk cover opening 113 is formed in apart of the reagent disk cover 112. A reagent dispensing nozzle 114 is rotatable and vertically movable, and lowered after rotational movement to the position above the opening 113 of the reagent disk cover 112 so as to immerse the tip of the reagent dispensing nozzle 114 in the reagent inside the predetermined reagent container for suction of a predetermined quantity of the reagent. After being lifted, the reagent dispensing nozzle 114 is rotationally moved to the position above the predetermined position of the incubator disk 104 to discharge the reagent to the reaction vessel 105.

Upon reception of the discharged sample and reagent, the reaction vessel 105 is moved to the predetermined position through rotation of the incubator disk 104. It is then carried to the reaction vessel stirring mechanism 108 by the sample dispensing chip/reaction vessel carrying mechanism 106. The reaction vessel stirring mechanism 108 stirs the sample and the reagent inside the reaction vessel by applying the rotational motion to the reaction vessel for mixing the sample and the reagent. Upon termination of stirring, the reaction vessel is returned to the predetermined position of the incubator disk 104 by the sample dispensing chip/reaction vessel carrying mechanism 106.

The reaction vessel 105 is gripped and lifted by a reaction vessel carrying mechanism 115 which transfers the reaction vessel 105 between the incubator disk 104 and a detection unit 116 so as to be carried to the detection unit 116 through the rotational movement. The reaction vessel is analyzed inside the detection unit 116. The reaction vessel 105 having the reaction liquid sucked is moved to the predetermined position through rotation of the incubator disk 104. The sample dispensing chip/reaction vessel carrying mechanism 106 moves the reaction vessel from the incubator disk 104 to the position above the sample dispensing chip/reaction vessel disposal hole 109. The reaction vessel, then is disposed from the disposal hole.

Figure 2:
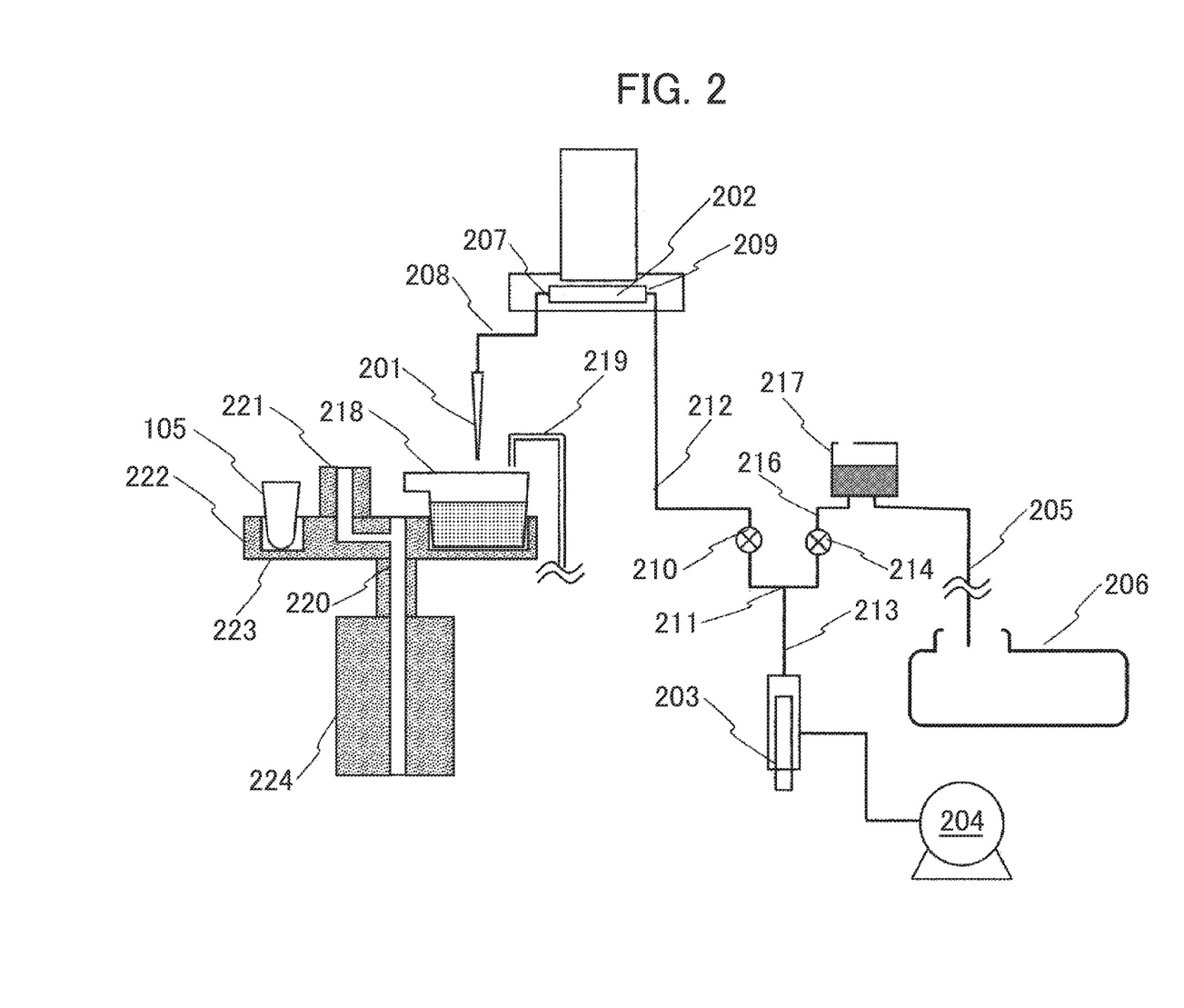
FIG. 2 is a view showing a detailed structure of a detection unit.

FIG. 2 shows a detailed analysis flow of the detection unit.

FIG. 2 is a view schematically showing a structure of the flow channel with the flow cell detector in the analysis apparatus as well as peripheral members. The detection unit and its periphery include a suction nozzle 201 for suction or discharge of liquid and air, a flow cell detector 202 for detecting the measuring object, a syringe 203 for generating the pressure difference for suction or discharge of liquid and air, a system water feed pump 204 connected to the syringe 203, a drain flow channel 205 for discharge of liquid and air, a drain tank 206 for storing the discharged liquid, having its content periodically replaced, a first flow channel 208 for communication between the nozzle and an inlet connection part 207 of the flow cell detector, a second flow channel 212 for communication from an outlet connection part 209 of the flow cell detector to a branch part 211 via a first valve 210, a third flow channel 213 for communication to the syringe via the branch part 211, a fourth flow channel 216 for communication from the branch part 211 to the drain 205 via a second valve 214, an atmosphere releasing part 217 disposed between the second valve and the drain, a liquid container 218 for storing the liquid (auxiliary reactive liquid) to be sucked by the suction nozzle, a flow channel 219 for supplying the auxiliary reactive liquid (for example, diluent, cleaning agent, reagent, system water, and the like) to the container, a flow channel 220 for disposal of the liquid overflown from the container, a cleaning tank 221 for cleaning the suction nozzle 201, a table 222 for holding the liquid container 218 at the specific position, a reaction vessel mount part 223, and a table drive mechanism 224. The flow channel 219, the flow channel 221, the table 222, the reaction vessel mount part 223, the cleaning tank 221, and the table drive mechanism 224 will be collectively referred to as a reservoir unit 230.

Figure 3:
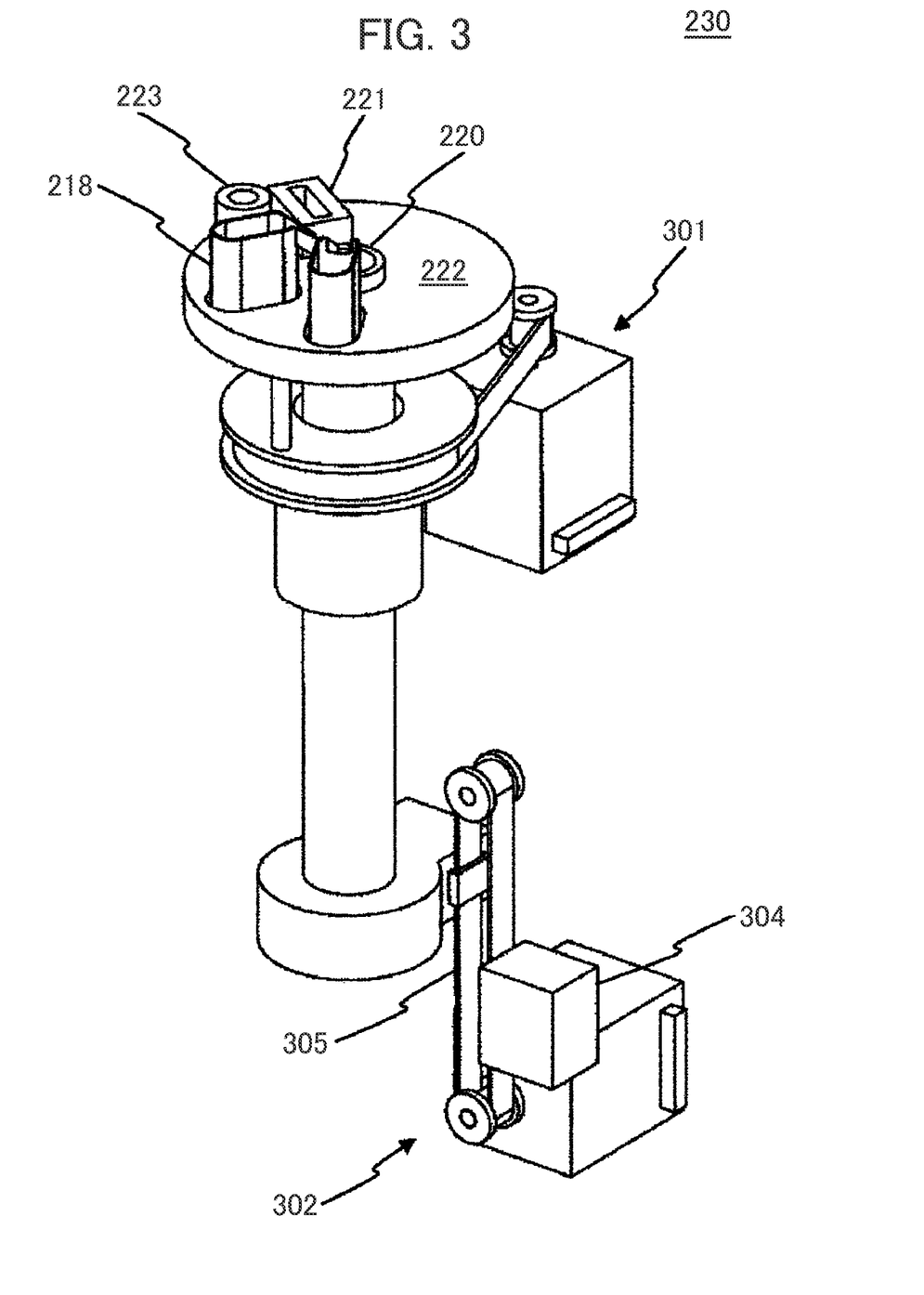
FIG. 3 is a view showing a detailed structure of a reservoir unit.
Figure 4:
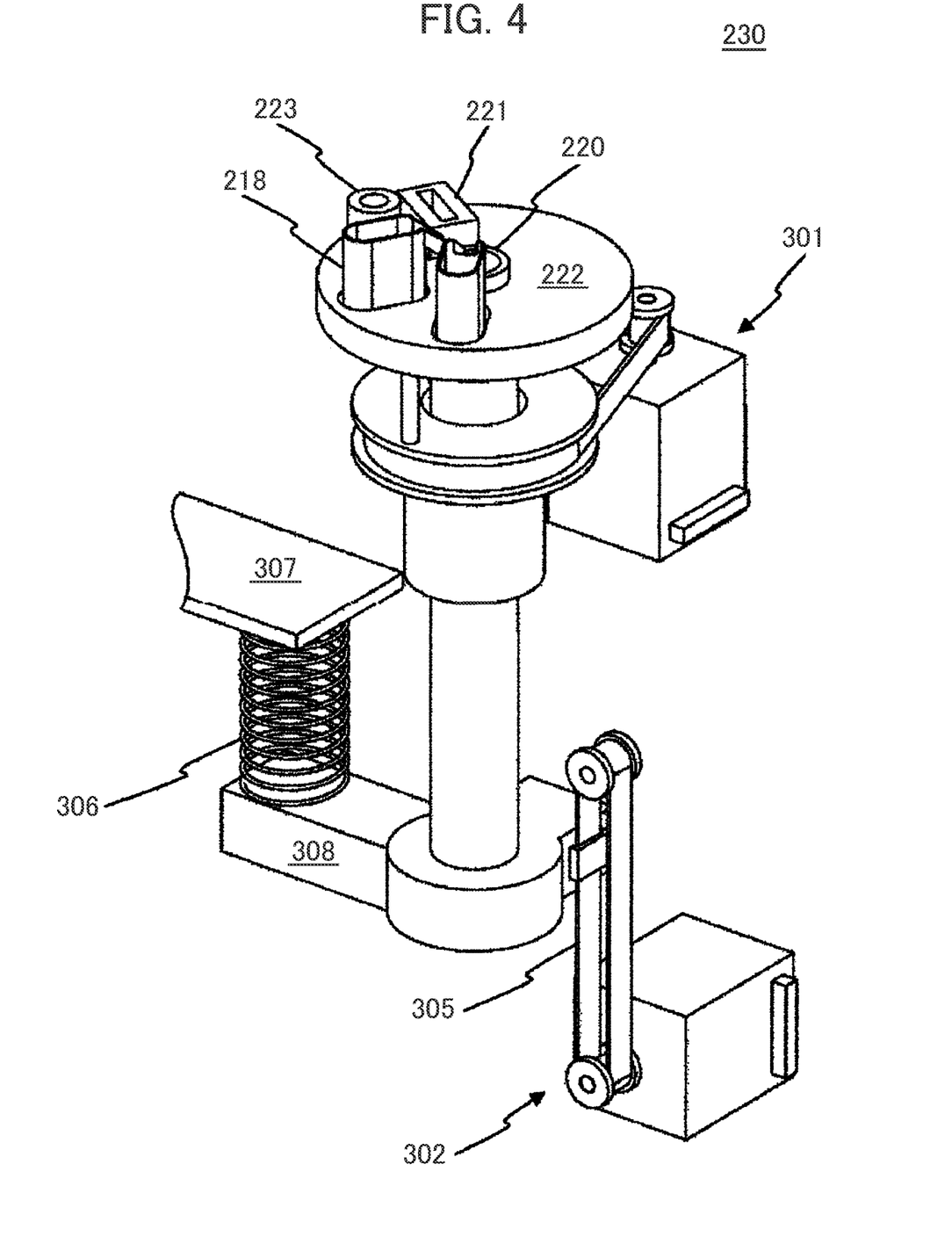
FIG. 4 is a view showing a detailed structure of a reservoir unit.

FIGS. 3 and 4 illustrate the reservoir unit 230 in detail.

The table 222 having the reaction vessel mount part 223, the liquid container 218, and the cleaning tank 221 disposed thereon is set at the desired position by the table drive mechanism 224 including a table rotating mechanism 301 and a table vertical mechanism 302. The table rotating mechanism 301 includes a motor which rotates the table, and a rotary drive belt which transmits the motor drive to the table. The table vertical mechanism includes a motor which vertically moves the table, and a vertical drive belt which transmits the motor drive to the table. The table 222 is connected to the vertical drive belt via a shaft.

A counterweight 304 serving as a table positional adjustment mechanism is attached to the vertical drive belt of the table vertical mechanism. In the case of no power supply to the table vertical drive mechanism 302, the counterweight serves to prevent self-weight descending of the table 220 in the vertical direction. In other words, even in the case of no power supply to the table vertical mechanism 302, the weight of the counterweight 304 is balanced with the weight of the reservoir unit 230 including the table 220 via the vertical drive belt 305 so that the table is held at a constant vertical position.

FIG. 4 is a view illustrating a structure of the reservoir unit 230 without using the counterweight 304. A spring 306, and spring holders 307, 308 are employed instead of the counterweight. The spring holder 308 is connected to the lower end of the reservoir unit 230. The spring holder 307 is fixed to the position at the predetermined height.

Even in the case of no power supply to the table vertical mechanism 302, the weight of the reservoir unit 230 is balanced with the elastic force of the spring 306 pulled by the spring holder 308 for restoration to the original state.

This makes it possible to hold a liquid container holding member at the constant position without vertically moving downward.

The structure of the table positional adjustment mechanism is not limited to the above-described embodiment, but may be in an arbitrary form so long as the structure is capable of supporting the weight of the reservoir unit 230 when the power supply is cut OFF.

As for the structure of the flow channel, all the flow channels in the range from the suction nozzle to the drain are fixed. The flow cell detector 202 is fixed at the vertically upper position than those of other mechanisms such as the suction nozzle 201 and the pump 204. The predetermined reaction vessel 105 on the incubator disk 104 is transferred to the reaction vessel mount part 223 to be moved to the position just below the suction nozzle 201 by rotating the table 222 operated by the table rotating mechanism 301. Then, the vertical drive mechanism 302 lifts the liquid container holding member to insert the suction nozzle 201 into the reaction vessel 105. Upon insertion of the suction nozzle 201 into the reaction vessel 105, the syringe 203 feeds the reagent liquid into the flow cell detector 202 via the suction nozzle 201. The reaction liquid sucked by the suction nozzle 201 is analyzed in the flow cell detector 202.

Figure 5:
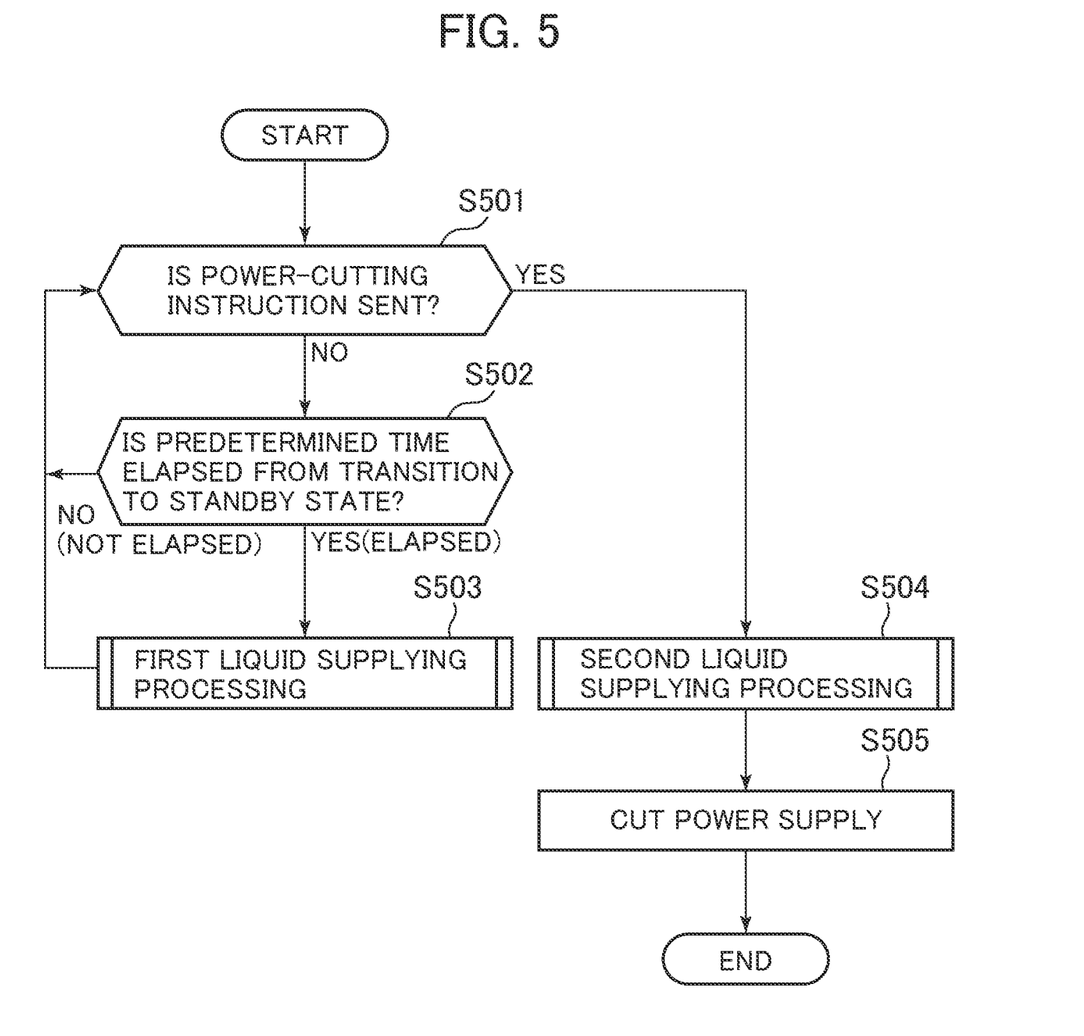
FIG. 5 is a flowchart representing a flow of liquid/water supply to a flow channel provided with a flow cell.

The flow of liquid/water supply to the flow cell will be described referring to FIGS. 5 to 7.

It is determined whether or not a power-cutting instruction has been sent to the automatic analysis apparatus system (step S501). When the power-cutting instruction has not been sent (activating state), it is determined whether or not a predetermined period has elapsed from transition to the standby state upon termination of the analysis operation (step S502). Then first liquid supplying processing is executed at each fixed time interval (step S503). Accordingly, the first liquid supplying processing is repetitively executed at the fixed time intervals so long as the automatic analysis system is kept in the standby state.

Figure 6:
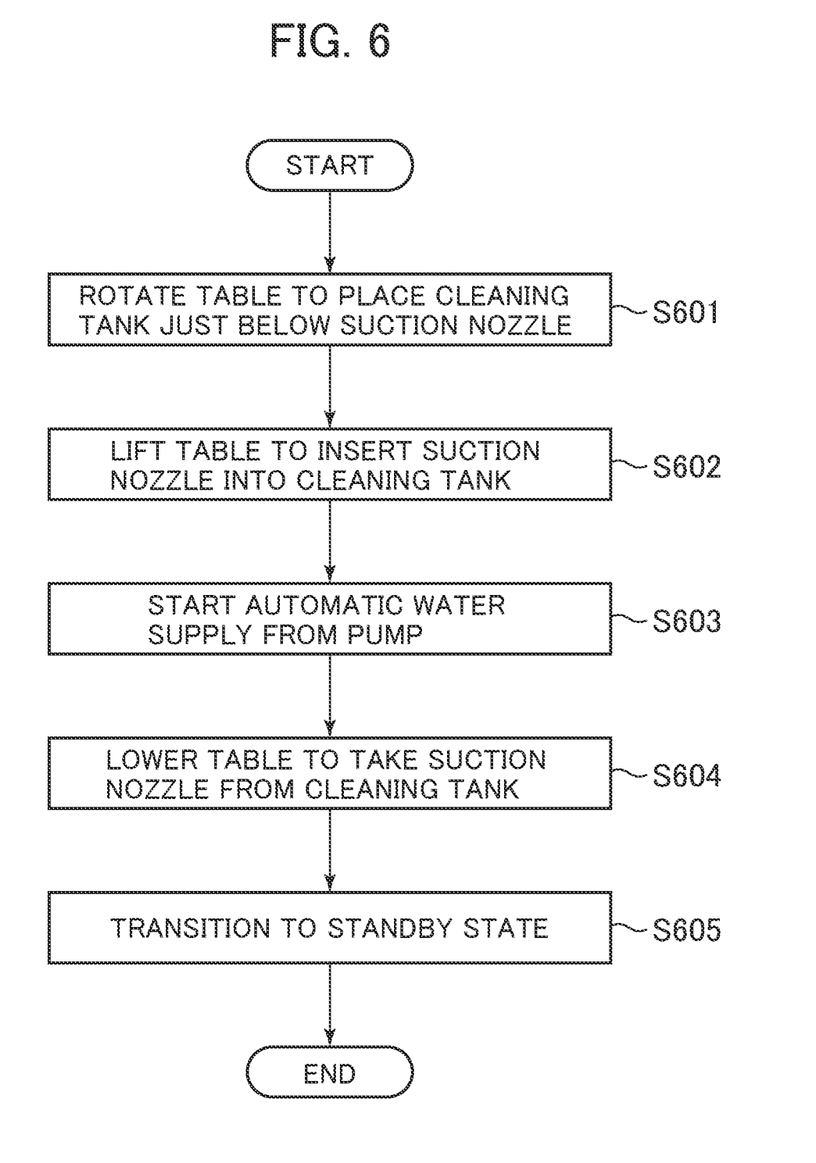
FIG. 6 is a flowchart representing first liquid supplying processing.
Figure 7:
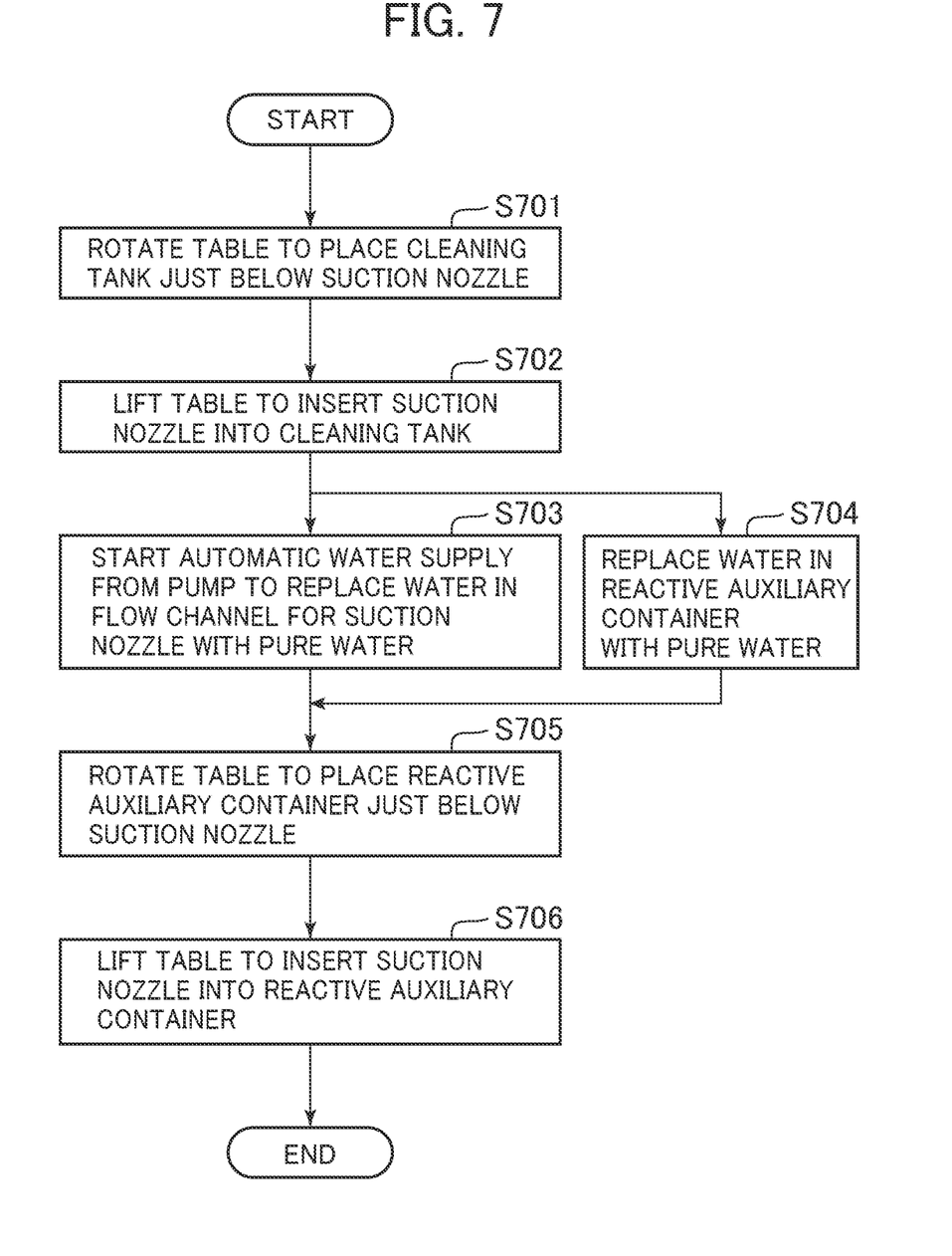
FIG. 7 is a flowchart representing second liquid supplying processing.

FIG. 6 shows the detailed procedure for executing the first liquid supplying processing. The power supply to the apparatus is ON in the first liquid supplying processing. As water is feedable from the pump, the liquid is supplied to the flow channels including the flow cell using water fed from the pump. The table rotating mechanism 301 is operated to rotate the table 222 so as to move the cleaning tank 221 to the position just below the suction nozzle 201 (S601). Then the table vertical mechanism 302 is operated to lift the table to insert the suction nozzle 201 into the cleaning tank 221 (step S602). The system water feed pump 204 is operated to supply system water to both the suction nozzle 201 and the drain 205 via the flow channel from the syringe 203 (step S603). Upon termination of the system water supply, the table vertical mechanism 302 is lowered so that the suction nozzle 201 is taken from the cleaning tank 221 (step S604), and the operation is brought into the standby state (step S605).

The predetermined time as described above is set to be within the time period elapsing until the flow channel is no longer filled with a liquid owing to evaporation loss from the atmosphere releasing part 217. The system water supply quantity is set to the value sufficient to fill the flow channels in both ranges from the suction nozzle 201 to the syringe 203 through the branch part 211, and from the atmosphere releasing part 217 to the syringe 203 through the branch part 211. The first liquid supplying processing brings the inside of the flow channel into the steady state where the flow channel is constantly filled with a liquid.

Meanwhile, there will be no power supply to the respective mechanisms in the automatic analysis apparatus system upon reception of the power-cutting instruction. Accordingly, the flow channel cannot be filled with water from the pump in spite of possibility that the liquid is likely to be evaporated away from the atmosphere releasing part and the like formed in the flow channel. In the state where the automatic analysis apparatus system is stopped, and the pump and the motor are brought into the non-activating state because of no power supply, second liquid supplying processing is executed (step S504) for supplying the liquid into the flow channel before the automatic analysis apparatus system is actually stopped upon reception of the power-cutting instruction.

The second liquid supplying processing will be explained referring to FIG. 7. The table 222 is rotated by the table rotating mechanism 301 to move the cleaning tank 221 to the position just below the suction nozzle 201 (step S701). Then the table vertical mechanism is operated to insert the suction nozzle 201 into the cleaning tank 221 (step S702). The system water feed amount pump 204 is activated to supply the system water to both lines for the suction nozzle 201 and the drain 205 via the flow channels from the syringe 203 (step S703). Concurrently with execution of step S703, the system water is supplied to the liquid container 218 from the flow channel 219 so that the container is filled with the system water (step S704). The table rotating mechanism 301 is operated to move the liquid container 218 filled with water with sufficient capacity to the position just below the suction nozzle 201. Then the table vertical mechanism 302 is operated to immerse the suction nozzle 201 in the system water contained in the liquid container 218 (step S705). Upon termination of step S705, power supply to the automatic analysis apparatus system is stopped (step S505). The table is kept at the predetermined position by a table position holding mechanism even in the state where power supply is stopped. This makes it possible to maintain the suction nozzle 201 at the immersion position in the system water contained in the liquid container 218.

The second liquid supplying processing serves to compensate for the loss of liquid in the flow channel owing to evaporation from the atmosphere releasing part 217 and the like, allowing the flow channel to be constantly filled with water through supplementation from the suction nozzle 201 immersed in the system water contained in the liquid container 218. In the present embodiment, the table rotating mechanism 301 and the table vertical mechanism 302 are operated to move the liquid container 218 and the cleaning tank 221 to the suction nozzle 201. It is also possible to provide the rotational drive mechanism, the vertical drive mechanism, and the vertical position holding mechanism at the side of the suction nozzle 201.

LIST OF REFERENCE SIGNS

100: analysis apparatus,
101: rack,
102: sample container,
103: sample dispensing nozzle,
104: incubator disk,
105: reaction vessel,
106: reaction vessel carrying mechanism,
107: sample dispensing chip/reaction vessel holding member,
108: reaction vessel stirring mechanism,
109: sample dispensing chip/reaction vessel disposal hole,
110: sample dispensing chip loading position, 111: reagent disk,
112: reagent disk cover,
113: reagent disk cover opening,
114: reagent dispensing nozzle,
115: reaction vessel carrying mechanism,
116: detection unit,
117: rack carriage line,
120: rack carriage section,
121: power supply instructing unit,
122: power-cutting instructing unit,
123: control computer,
201: suction nozzle,
202: flow cell detector,
203: syringe,
204: system water feed pump,
205: drain flow channel,
206: drain tank,
207: inlet connection part,
208: first flow channel,
209: outlet connection part,
210: first valve,
211: branch part,
212: second flow channel,
213: third flow channel,
214: second valve,
216: fourth flow channel,
217: atmosphere releasing part,
218: liquid container,
219: flow channel,
220: flow channel,
221: cleaning tank,
222: table,
223: reaction vessel mount part,
224: table drive mechanism,
230: reservoir unit,
301: table rotating mechanism,
302: table vertical mechanism,
304: counterweight,
305: vertical drive belt,
306: spring,
307: spring holder,
308: spring holder

The invention claimed is:

1. An automatic analysis apparatus comprising:
a detection unit including a flow cell configured to accommodate a reaction liquid serving as an analysis subject;
a suction nozzle configured to suck the reaction liquid into the flow cell via a flow channel;
an atmosphere releasing vessel comprising an opening and configured to evaporate any liquid disposed therein via the opening and to discharge any liquid disposed therein;
a pump configured to supply a pumped liquid to the flow cell and the atmosphere releasing vessel;
a drain tank that stores the liquid discharged from the atmosphere releasing vessel;
a power-cutting instructing unit configured to transmit a power-cutting instruction to cut a power supply to the pump;
a table configured to adjust a position of a tank and an auxiliary container, the table comprising:
  a vertical drive mechanism that moves the table in a vertical direction;
  a rotating mechanism that rotates the table; and
  a positional adjustment mechanism that holds a constant vertical position of the table after cutting the power supply; and
a control unit configured to:
  execute, while the power-cutting instruction from the power-cutting instruction unit is not received, first liquid supplying processing to:
    cause the suction nozzle to be inserted into the tank using the vertical drive mechanism of the table,
    cause the pump to supply the pumped liquid to the suction nozzle via the flow channel,
    terminate the supply of the pumped liquid to the suction nozzle via the flow channel, and
    transition the automatic analysis apparatus to a standby state, and
  execute second liquid supplying processing in response to receipt of the power-cutting instruction from the power-cutting instructing unit to:
    cause the suction nozzle to be inserted into the tank by raising the tank using the vertical drive mechanism of the table, and
    cause the pump to supply the pumped liquid to the flow cell and suction nozzle via the flow channel,
    cause the pump to supply the pumped liquid to the auxiliary container,
    rotate positions of the tank and the auxiliary container using the rotating mechanism of the table,
    cause the suction nozzle to be inserted into the auxiliary container by raising the auxillary container using the vertical drive mechanism of the table, and
    stop supply of power to the automatic analysis apparatus, wherein
      the suction nozzle, the flow cell, the atmosphere releasing vessel, and the drain tank are connected in sequence via the flow channel;
      the flow cell is disposed at a position higher than positions of the auxiliary container, the suction nozzle, the atmosphere releasing vessel, and the drain tank in a gravity direction; and
      the atmosphere releasing vessel is disposed at a position higher than a position of the drain tank in a gravity direction.

2. The automatic analysis apparatus according to claim 1, wherein
the control unit controls the pump to repetitively supply the pumped liquid to the flow cell at a time interval, wherein
the time interval is based on an elapsed duration to which the flow channel is no longer filled with any liquid due to evaporation from the atmosphere releasing vessel.

3. The automatic analysis apparatus according to claim 1, wherein
the vertical drive mechanism includes a motor and a vertical drive belt that transmits a drive of the motor to the table;
the positional adjustment mechanism is a counterweight attached to the vertical drive belt; and
the counterweight is balanced to match a combined weight of the table, the tank, and the vertical drive mechanism.

4. The automatic analysis apparatus according to claim 1, wherein
the positional adjustment mechanism includes an elastic body that holds the table at a constant predetermined vertical position.

5. A method of maintaining an automatic analysis apparatus, the method comprising:
- accommodating, using a flow cell of a detection unit, a reaction liquid serving as an analysis subject;
- sucking, using a suction nozzle, the reaction liquid into the flow cell via a flow channel;
- evaporating, using an atmosphere releasing vessel comprising an opening, any liquid disposed therein via the opening;
- discharging from the atmosphere releasing vessel any liquid disposed therein;
- supplying, using a pump, a pumped liquid to the flow cell and to the atmosphere releasing vessel;
- storing the liquid discharged from the atmosphere releasing vessel using a drain tank, wherein
  - the suction nozzle, the flow cell, the atmosphere releasing vessel, and the drain tank are connected in sequence via the flow channel;
  - the flow cell is placed at a position upper than positions of an auxiliary container, the suction nozzle, the atmosphere releasing vessel, and the drain tank in a gravity direction; and
  - the atmosphere releasing vessel is placed at a position upper than a position of the drain tank in a gravity direction; and
- executing, using a control unit configured to perform first and second liquid supplying processing, the first liquid supplying processing comprising:
  - inserting the suction nozzle into a tank using a vertical drive mechanism of a table;
  - supplying the pumped liquid to the suction nozzle via the flow channel using the pump after the inserting;
  - terminating the supply of the pumped liquid to the suction nozzle via the flow channel;
  - causing the suction nozzle to be removed from the tank after the terminating using the vertical drive mechanism of the table; and
  - transitioning the automatic analysis apparatus to a standby state; and
- executing, using the control unit, the second liquid supplying processing in response to receiving a power-cutting instruction, comprising:
  - inserting the suction nozzle into the tank by raising the tank using the vertical drive mechanism of the table;
  - supplying the pumped liquid to the flow cell and suction nozzle via the flow channel;
  - supplying the pumped liquid to the auxiliary container;
  - rotating the table on which the tank and the auxiliary container are disposed using a rotating mechanism to adjust positions of the tank and the auxiliary container with respect to the suction nozzle;
  - immersing the suction nozzle in the pumped liquid contained in the auxiliary container by raising the auxiliary container using the vertical drive mechanism of the table;
  - stopping supply of power to the automatic analysis apparatus;
  - holding a constant vertical position of the table using a positional adjustment mechanism after the stopping the supply of power to the automatic analysis apparatus.

6. The maintenance method according to claim 5, wherein the first liquid processing further comprises:
- controlling the pump, using the control unit to repetitively supply the pumped liquid to the flow cell at a time interval, wherein
  - the time interval is based on an elapsed duration to which the flow channel is no longer filled with any liquid due to evaporation from the atmosphere releasing vessel.

7. The maintenance method according to claim 5, wherein
- the vertical drive mechanism includes a motor and a vertical drive belt that transmits a drive of the motor to the table;
- the positional adjustment mechanism is a counterweight attached to the vertical drive belt; and
- the counterweight is balanced to match a combined weight of the table, the tank, and the vertical drive mechanism.

8. The maintenance method according to claim 5, wherein the positional adjustment mechanism includes an elastic body that holds the table at a constant predetermined position.

* * * * *